No. 812,112. PATENTED FEB. 6, 1906.
A. B. CAMPBELL.
BRIDLE BIT.
APPLICATION FILED MAR. 8, 1905.
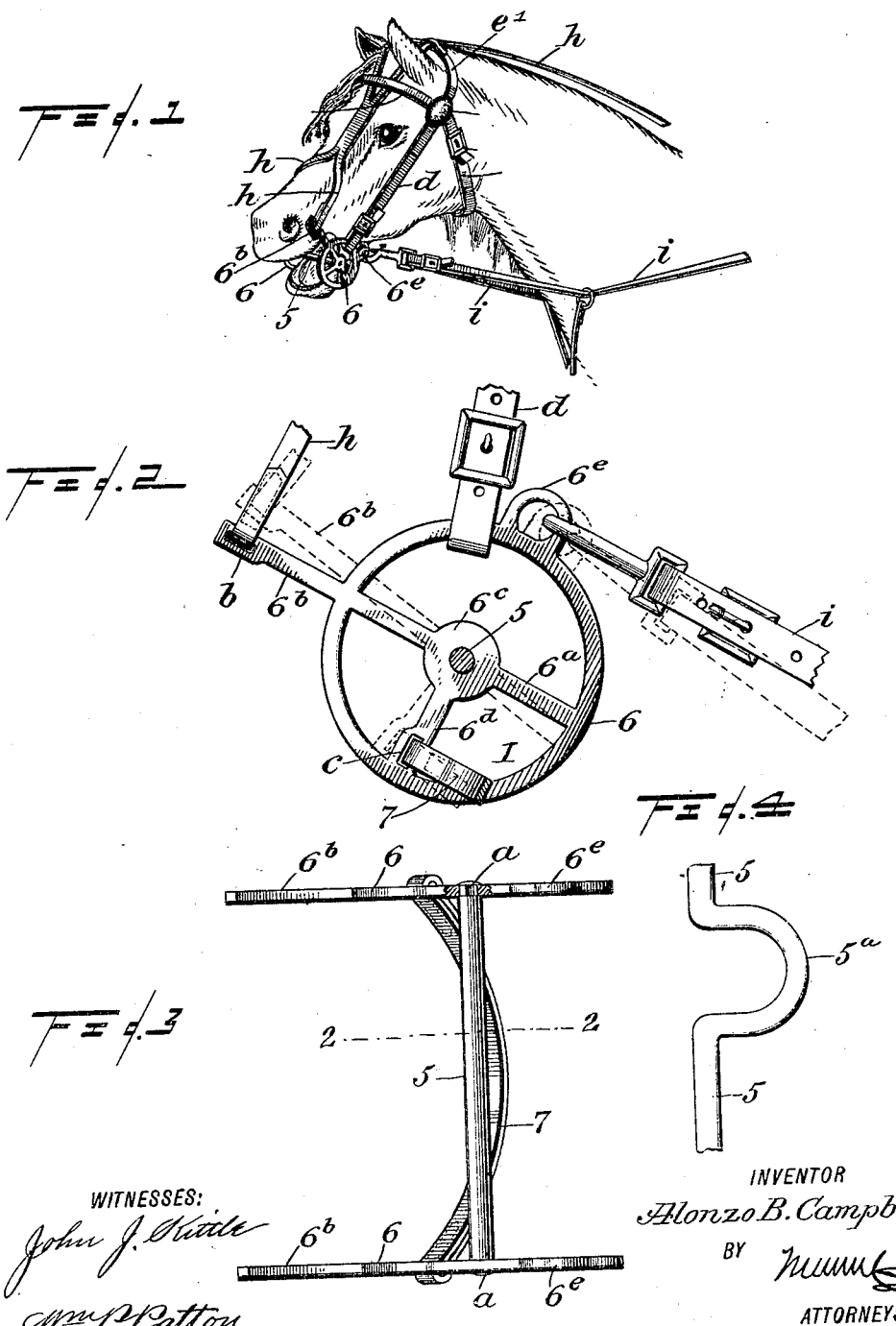
WITNESSES:
INVENTOR
Alonzo B. Campbell
BY
ATTORNEYS

UNITED STATES PATENT OFFICE.

ALONZO B. CAMPBELL, OF CORAOPOLIS, PENNSYLVANIA.

BRIDLE-BIT.

No. 812,112.     Specification of Letters Patent.     Patented Feb. 6, 1906.

Application filed March 8, 1905. Serial No. 248,985.

*To all whom it may concern:*

Be it known that I, ALONZO B. CAMPBELL, a citizen of the United States, and a resident of Coraopolis, in the county of Allegheny and State of Pennsylvania, have invented a new and Improved Bridle-Bit, of which the following is a full, clear, and exact description.

This invention relates to bridle-bits used for the control of a horse when riding or driving the animal, and has for its object to provide novel details of construction for a bridle-bit that adapt it either for the control of vicious hard-mouthed animals or those that are easily controlled.

The invention consists in the novel construction and combination of parts, as is hereinafter described and claimed.

Reference is to be had to the accompanying drawings, forming a part of this specification, in which similar characters of reference indicate corresponding parts in all the figures.

Figure 1 is a perspective view of the improved bit and bridle mounted upon the head of a horse, showing the application of the improvement as applied for the control of a vicious horse. Fig. 2 is an enlarged transverse sectional view of the improvement substantially on the line 2 2 in Fig. 3 and strap ends connected with a detail of the bit and that in completed condition are parts of the bridle. Fig. 3 is a partly-sectional plan view of details of the bit and of a curb-strap secured by its ends thereon, and Fig. 4 is a fragmentary plan view of a bit-bar that may be employed.

The bit-bar 5 (shown in Fig. 3) is in the form of a straight cylindrical rod of a suitable length and diameter; but said bar may have a looped bend 5ª formed at its longitudinal center, as represented in Fig. 4. As shown in Fig. 3, the end portions $a$ of the bit-bar 5 are each rendered angular, one end being shown exposed in said figure. Two similar cheek-rings 6 6 are employed, each consisting of a circular ring having a central cross-bar 6ª, which is prolonged at one of its ends outside of the ring, providing a check-lever 6ᵇ of suitable length, and, as shown, for one lever in Fig. 2 a longitudinal slot $b$ is formed therein near the free end thereof and a like provision is made for each check-lever. A hub-like enlargement 6ᶜ is formed at the center of each cross-bar 6ª, and centrally in each hub an angular perforation is formed, which receives a corresponding angular end portion $a$ of the bit-bar 5, said ends being secured in the hubs by riveting them over on the outer sides of the latter, whereby the cheek-rings 6 are securely mounted upon the ends of the bit-bar parallel with each other. It is essential that the check-levers 6ᵇ project from the normally forward side of the bridle-bit and be disposed directly opposite each other. At a right angle to the cross-bar 6ª on each cheek-ring 6 a curb-bar 6ᵈ extends between a respective hub 6ᶜ and the normally lower portion of the check-ring.

The similar curb-bars 6ᵈ are each slotted longitudinally near the body of the check-ring, as shown, for one bar in Fig. 2, these slots $c$, respectively, receiving an end portion of a stout curb-strap 7, secured to the curb-bars, and for effective service the curb-strap 7 is of such a length that it may be passed below the lower jaw of an animal that receives the bit-bar in its mouth, the bowed strap having a rearward trend, as indicated in Fig. 2. A chain may be substituted for the curb-strap. An eye 6ᵉ is formed on the exterior of each ring 6 opposite the curb-bar 6ᵈ.

As before mentioned, the check-levers 6ᵇ project forwardly and should have such a length as will afford necessary leverage, and in the slot $b$, formed in the free end of each lever, one end of the furcated overdraw-rein $h$ is secured, said rein being extended over the head of the animal, under or on the straps of the head-stall, and thence rearward for manipulation as occasion may require. It will be seen that the overdraw-rein $h$ may be of such a length as will permit it to be grasped by the driver seated in a vehicle drawn by an animal controlled by the improvement.

In arranging the driving-reins $i$ $i$ for control of a horse that is tender in the mouth or of a gentle disposition, assuming that the curb-strap 7 loosely engages the lower jaw of the animal, the forward ends of the reins are buckled upon the check-rings 6 6 in spaces I, that are immediately behind the curb-bars 6ª. It will be seen that by this connection of the reins the pull on the bit-bar 5 is not severe and will not hurt the tender mouth of the animal. In case the beast is hard in the mouth the ends of the reins are then connected with the cheek-rings above the cross-bars 6ª, which will adapt pulling strain on the reins to rock the bit-bar in the mouth of the animal and cause the curb-strap 7 to press on the lower jaw of the beast, thus giving the animal pain and releasing the bit, that may have been held between the teeth and thus rendered ineffective. If the beast is of a vicious nature and hard to control, the reins are engaged at their ends in the eyes $6^e$, which will give increased leverage for the rocking movement of the curb-bars $6^d$ forwardly and a severe compression of the curb-strap 7 upon the lower jaw of the animal. Should the animal get beyond control after effort has been made to do so, by pulling upon the driving-reins $i$ the overdraw-rein $h$ may then be used, which if forcibly pulled upon will rock the check-levers $6^b$ upward and rearward, which will correspondingly rock the curb-bars $6^d$ forward and pull with great force on the lower jaw of the animal, the pain causing the beast to stop or slacken speed, so as to become manageable.

The device may be termed a "lugging, lolling, stumbling, and runaway bit." It will keep the mouth of the horse shut, preventing entrance of dust in summer and frost in winter. It will also prevent the horse from forging or striking the front feet with the hind feet and if tightly reined up will prevent the horse from kicking in harness.

Having thus described my invention, I claim as new and desire to secure by Letters Patent—

A bridle-bit embodying two similar cheek-rings, each having a cross-bar and a central hub on each cross-bar, said hubs supporting a transverse bit-bar, a curb-bar extended down at a right angle from each cross-bar and merging into the body of the ring, said curb-bars each having a slot therein near the ring, an eye formed on each ring opposite the curb-bar, and a check-lever extended outside of each ring in alinement with the cross-bar therein and projected forwardly, said levers each having an opening at its free end for the engagement therewith of an end of an overdraw-rein.

In testimony whereof I have signed my name to this specification in the presence of two subscribing witnesses.

ALONZO B. CAMPBELL.

Witnesses:
   A. M. DUNLAP,
   FRANK R. NESBIT.